US010635838B1

(12) United States Patent
Shemer et al.

(10) Patent No.: US 10,635,838 B1
(45) Date of Patent: Apr. 28, 2020

(54) CLOUD BASED DEAD DROP FOR ISOLATED RECOVERY SYSTEMS

(71) Applicant: EMC IP Holding Company LLC, Hopkinton, MA (US)

(72) Inventors: Jehuda Shemer, Kfar Saba (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 438 days.

(21) Appl. No.: 15/664,901

(22) Filed: Jul. 31, 2017

(51) Int. Cl.
| | |
|---|---|
| *G06F 12/00* | (2006.01) |
| *G06F 21/64* | (2013.01) |
| *G06F 7/04* | (2006.01) |
| *H04L 29/06* | (2006.01) |
| *G06F 11/14* | (2006.01) |

(52) U.S. Cl.
CPC .......... *G06F 21/64* (2013.01); *G06F 11/1456* (2013.01); *H04L 63/10* (2013.01); *H04L 63/1441* (2013.01); *H04L 63/168* (2013.01); *G06F 2201/805* (2013.01)

(58) Field of Classification Search
CPC ...... G06F 21/64; G06F 11/1456; H04L 63/10; H04L 63/1441; H04L 63/168
See application file for complete search history.

(56) References Cited

U.S. PATENT DOCUMENTS

| | | | | |
|---|---|---|---|---|
| 7,149,858 | B1 * | 12/2006 | Kiselev | G06F 11/2076 |
| | | | | 711/162 |
| 9,128,626 | B2 * | 9/2015 | Chacko | G06F 3/0604 |
| 9,667,477 | B2 * | 5/2017 | Kacin | H04L 63/0428 |
| 9,940,203 | B1 * | 4/2018 | Ghatnekar | G06F 16/13 |
| 9,955,444 | B1 * | 4/2018 | Blum | G06F 16/27 |
| 10,148,493 | B1 * | 12/2018 | Ennis, Jr. | H04L 41/0803 |
| 10,353,790 | B1 * | 7/2019 | Rangaiah | G06F 11/263 |
| 2003/0172145 | A1 * | 9/2003 | Nguyen | G06Q 10/10 |
| | | | | 709/223 |
| 2006/0156059 | A1 * | 7/2006 | Kitamura | G06F 11/1092 |
| | | | | 714/6.21 |
| 2013/0204849 | A1 * | 8/2013 | Chacko | G06F 3/0604 |
| | | | | 707/692 |
| 2016/0314307 | A1 * | 10/2016 | Kacin | H04L 63/0428 |
| 2016/0330219 | A1 * | 11/2016 | Hasan | G06N 20/00 |
| 2017/0177895 | A1 * | 6/2017 | McHale | G06F 21/6218 |

* cited by examiner

*Primary Examiner* — Shanto Abedin
(74) *Attorney, Agent, or Firm* — Chamberlain, Hrdlicka, White, Williams & Aughtry

(57) ABSTRACT

A method and system for implementing a cloud-based dead drop for isolated recovery systems. Specifically, the disclosed method and system entail the interjection of an object store as an intermediate storage relay between a production system and an isolated recovery system. The object store minimizes, if not eliminates, the exposure of data secured in the isolated recovery system from external cyber threats and attacks, as well as launches the deployment of the isolated recovery system as a service that may support any system.

14 Claims, 5 Drawing Sheets

CLOUD BASED DEAD DROP FOR ISOLATED RECOVERY SYSTEMS

BACKGROUND

Current data backup and archiving solutions are contingent on direct communications between a production system and the backup storage system. However, direct communications still leaves the backup storage system exposed to cyber threats or attacks that have contaminated the production system.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a cloud-based dead drop for isolated recovery systems. Specifically, one or more embodiments of the invention entail the interjection of an object store as an intermediate storage relay between a production system and an isolated recovery system. The object store minimizes, if not eliminates, the exposure of data secured in the isolated recovery system from external cyber threats and attacks, as well as launches the deployment of the isolated recovery system as a service that may support any system.

Figure 1:
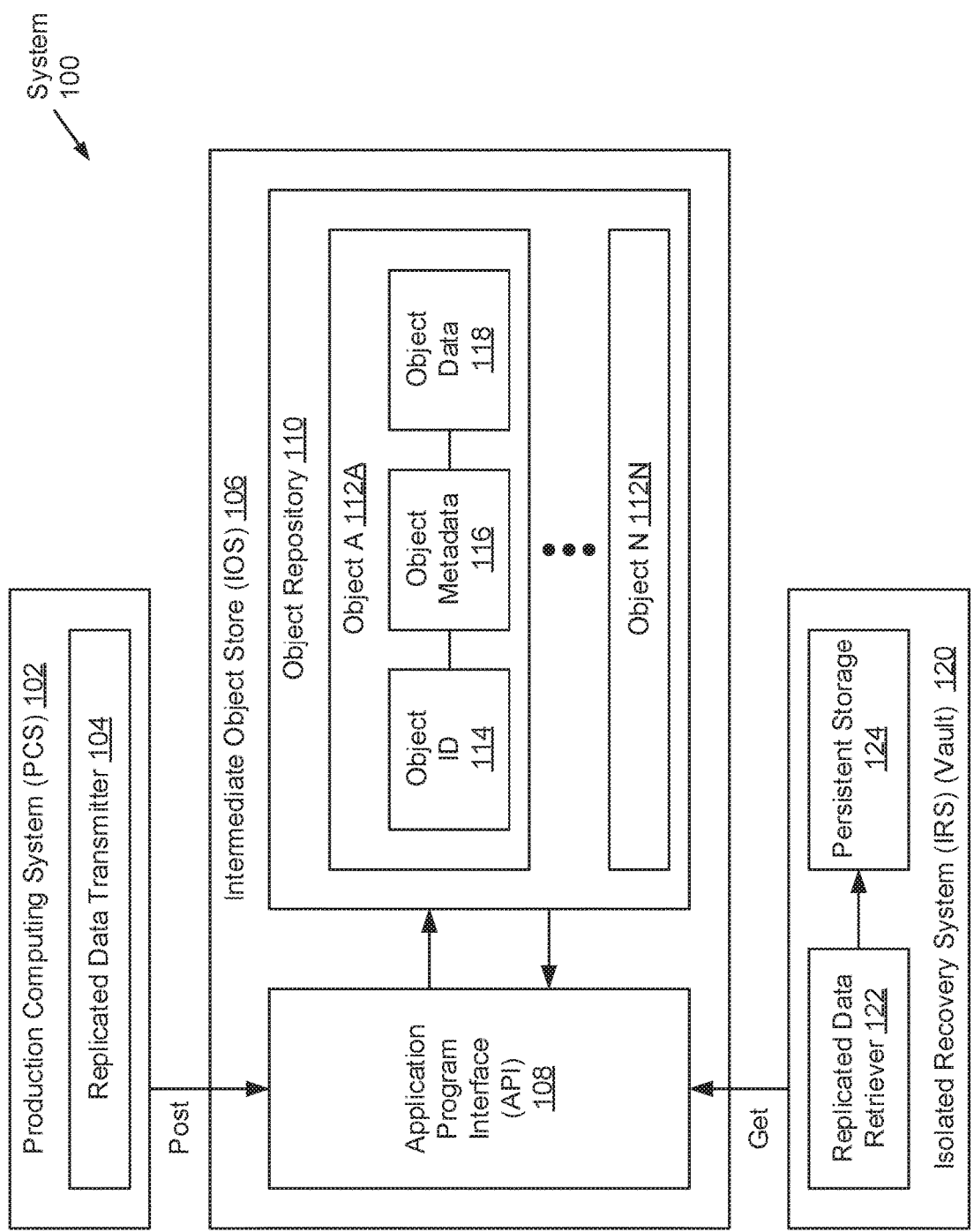
FIG. 1 shows a system in accordance with one or more embodiments of the invention.

FIG. 1 shows a system in accordance with one or more embodiments of the invention. The system (100) includes a production computing system (PCS) (102) operatively connected to an intermediate object store (IOS) (106), which in turn is operatively connected to an isolated recovery system (IRS) (120). Each of these components is described below.

In one embodiment of the invention, the aforementioned components may be directly or indirectly connected to each other using any combination of wired or wireless connections. In embodiments in which the aforementioned components are indirectly connected to one another, there may be other network infrastructure components or systems (e.g., switches, routers, servers, etc.) (not shown) that facilitate communication between the aforementioned components. Moreover, the aforementioned components may communicate with each other using any combination of wired and/or wireless communication protocols. By way of an example, the aforementioned components may employ Hyper Text Transfer Protocol Secure (HTTPS) towards enabling communications between one another.

In one embodiment of the invention, the PCS (102) may be any computing system (see e.g., FIG. 5) used for various applications. These applications may, for example, require large-scale and complex data processing. In one embodiment of the invention, the PCS (102) may be any computing system that may serve multiple users concurrently. Further, the PCS (102) may be programmed to provide and manage the allocation of computing resources towards the implementation of various processes (e.g., tasks) that may be instantiated by one or more users. Examples of the PCS (102) include, but are not limited to, a cluster of one or more interconnected desktop computers, laptop computers, smartphones, tablet computers, gaming consoles, servers, mainframes, etc.

In one embodiment of the invention, the PCS (102) may include a replicated data transmitter (104). The replicated data transmitter (104) may be a communication interface for enabling the transmission of replicated data, or at least one or more replicated data fragments, to the IOS (106). In one embodiment of the invention, a replicated data fragment may be any subset of a replicated data instance, whereas a replicated data instance may refer to a copy of a single, original data instance generated and/or otherwise utilized by the above-mentioned processes executing on the PCS (102). Furthermore, the replicated data transmitter (104) may be implemented using hardware, software, firmware, or any combination thereof. Examples of the replicated data transmitter (104) include, but are not limited to, a network interface controller/device, a network socket, one or more computer ports, etc.

In one embodiment of the invention, the replicated data transmitter (104) may include functionality to: (i) obtain/select an original data instance instantiated by a process (i.e., at least a portion of a computer program) executing on the PCS (102); (ii) replicate the original data instance to generate a replicated data instance; (iii) establish/initiate a connection with the IOS (106); (iv) generate one or more post requests, wherein each post request includes at least a portion or subset of the replicated data instance (i.e., the replicated data), a replicated data ID associated with the replicated data instance, and replicated data metadata describing the replicated data instance; and (v) transmit the one or more post requests to the IOS (106). By way of an example, each of the one or more post requests may be a HTTPS POST request.

In one embodiment of the invention, the IOS (106) may be a hardware and/or software implemented service that provides for and manages the consolidation of objects. The IOS (106) may be hosted on a physical server (e.g., in a data center) or on a virtual server that may be cloud-based. That is, in one embodiment of the invention, the IOS (106) may be hosted on a physical server that may be co-located with the PCS (102) in a same data center. In another embodiment of the invention, the IOS (106) may be hosted on a physical and/or virtual server residing in a public cloud computing environment. The IOS (106) may be hosted on a single server, or alternatively, on multiple servers that may be physical, virtual, or a combination thereof. In one embodiment of the invention, the IOS (106) may be hosted on any one of one or more computing systems similar to the exemplary computing system shown in FIG. 5. Furthermore, in one embodiment of the invention, the IOS (106) may be a third-party service. By way of an example, the third-party service may be the Amazon Simple Storage Service (S3) offered by Amazon Web Services, Inc. of Seattle, Wash.

In one embodiment of the invention, the IOS (106) may include an application program interface (API) (108). The API (108) may provide a specification for the exchange of information between the IOS (106) and the PCS (102), or the IOS (106) and the IRS (120). For example, the API (108) may establish that the exchange of information entails a request for processing and a return of a response, if any, based on the outcome of the processing (see e.g., FIGS. 2 and 3), wherein the request and response conforms to an accepted communication protocol (e.g., HTTPS). In one embodiment of the invention, the API (108) may include logic necessary for accessing the object repository (110) (described below). Moreover, the API (108) may be implemented using hardware, software, firmware, or any combination thereof. By way of an example, the API (108) may be a web API accessed through a webpage and/or web browser, and a wide area network (WAN) (e.g., Internet) connection.

In one embodiment of the invention, the API (108) may include functionality to: (i) receive one or more post requests from the PCS (102); (ii) generate an object based on the contents (i.e., replicated data ID, replicated data metadata, replicated data instance) of the one or more post requests; (iii) store the object in the object repository (110); (iv) receive a get request from the IRS (120); (v) in response to the get request, obtaining an object (112A-112N) from the object repository (110) using at least a portion of the contents (i.e., an object ID) of the get request; and (vi) transmit (via a get response) the object (112A-112N) to the IRS (120). By way of an example, the get request may be an HTTPS GET request.

In one embodiment of the invention, the IOS (106) may include an object repository (110). The object repository (110) may be implemented using any persistent (i.e., non-volatile) storage medium such as, for example, optical storage, magnetic storage, NAND Flash Memory, NOR Flash Memory, Magnetic RAM Memory (M-RAM), Spin Torque Magnetic RAM Memory (ST-MRAM), Phase Change Memory (PCM), or any other memory defined as a non-volatile Storage Class Memory (SCM). In one embodiment of the invention, the object repository (110) may be implemented using multiple persistent storage media, which may or may not be of the same type or located at the same physical site.

In one embodiment of the invention, the object repository (110) may include functionality to consolidate/store one or more objects (112A-112N). An object (112A-112N) may be a flexibly sized container in which data (i.e., a replicated data instance) may be stored. Further, in one embodiment of the invention, objects (112A-112N) may be signed and/or encrypted. Object signing may be employed to ensure the integrity of time and content associated with an object (112A-112N), thereby providing security capabilities that verify the source (e.g., the PCS (102)) of an object (112A-112N) and/or a mechanism for detecting the tampering of (or the performance of changes to) content associated with the object (112A-112N). In one embodiment of the invention, the content of an object (112A-112N) may include, but is not limited to an object ID (114), object metadata (116), and object data (118). Each of these components is described below.

In one embodiment of the invention, an object ID (114) may be an identifier associated with (or assigned to) an object (112A-112N). The object ID (114) may be expressed by a string of characters (e.g., letters, numbers, symbols, etc.) that uniquely identifies an object (112A-112N), and thereby distinguishes an object (112A-112N) from other objects (112A-112N) stored in the object repository (110). Further, in one embodiment of the invention, the object ID (114) may be generated by the API (108) during the instantiation of the object (112A-112N) with which the object ID (114) is associated (described below). In another embodiment of the invention, the object ID (114) may resemble, or be based on, a replicated data ID (not shown) associated with a replicated data instance (mentioned above) submitted by the PCS (102). By way of an example, an object ID (114) may be an alphanumeric tag, or may be a N-bit integer (where N>0) expressed in hexadecimal notation.

In one embodiment of the invention, object metadata (116) may refer to information that describes the object data (118) (i.e., the replicated data instance) within an object (112A-112N). The object metadata (116) may be segmented into system-defined metadata and user-defined metadata. In one embodiment of the invention, system-defined metadata may represent metadata generated and/or utilized by the IOS (106) at least in part for management of an object (112A-112N). Examples of system-defined metadata may include, but is not limited to: (i) a creation or last modified date and time associated with the object (112A-112N); (ii) a data size in bytes associated with the object (112A-112N); (iii) an enablement field representative of server-side encryption, deduplication, compression, or other storage features offered by the IOS (106) and applied to the object (112A-112N); (iv) an object version associated with the object (112A-112N); (v) a storage class defined by the IOS (106) and based on, for example, the access requirements (or frequency) of the object (112A-112N); and (vi) a complete object tag appended by the IOS (106) when transmission of all replicated data fragments (described above) forming a complete replicated data instance has been received and stored. In one embodiment of the invention, user-defined metadata may represent metadata generated and/or utilized by users of, or processes executing on, the PCS (102). Examples of user-defined metadata may include, but is not limited to: (i) comments summarizing the object data (118) (i.e., the replicated data instance) provided by a user; (ii) a user ID associated with the user with which the object data (118)

may be associated; (iii) a content type describing the data type and/or process/application that generated the object data (118); and (iv) a permissions list outlining which entities may access the object data (118).

In one or more embodiments of the invention, object metadata (116) may encompass information that describes one or more virtual machine disks (VMDKs) (described below). More specifically, object metadata (116) may include information pertinent to the recovery of virtual machines and their workload on a different or backup PCS (102). VMDK metadata may include, but is not limited to including: (i) a log file that may store configuration information for one or more virtual machines; (ii) a paging file that may store guest main memory information for one or more virtual machines; and (iii) a state file that may store the running state of one or more virtual machines.

In one embodiment of the invention, object data (118) may be representative of the replicated data instance provided by the PCS (102). As discussed above, a replicated data instance may be a copy or replication of an original data instance generated or otherwise utilized by one or processes executing on the PCS (102). The original data instance may have been slated or selected by the PCS (102), or alternatively, by at least one user of the PCS (102), for data backup and/or archiving purposes, at which time, the replicated data instance may have been generated and transferred to the IOS for storage (described below). Examples of the object data (118), and therefore, a replicated data instance may include, but are not limited to, text documents, images, audio clips, videos, software programs, or any other form of data.

In one or more embodiments of the invention, the object data (118) may encompass an image-based snapshot of at least a portion of a virtual machine disk (VMDK). A VMDK may be a file format that describes containers for virtual hard disk drives. That is, substantively, a VMDK may be an exact copy of a computer process (i.e., an instance of a computer program) executing on the PCS (102) at a given time, an application (i.e., a computer program) executing on the PCS (102) at a given time, which may be implemented through multiple computer processes, and/or a computing system (i.e., the PCS (102)) at a given time, which may be implemented through multiple applications (including an operating system (OS)).

In one embodiment of the invention, the IRS (120) may be an isolated backup and/or archiving storage system. In one embodiment of the invention, the IRS (120) may be referred as a vault. The IRS (120) may be implemented using any type of storage unit and/or device (e.g., a file system, database, collection of tables, or any other storage mechanism). Further, the IRS (120) may be implemented using multiple storage units and/or devices, which may or may not be of the same type or located at the same physical site. In one embodiment of the invention, the IRS (120) may remain mostly disconnected (or limitedly connected) from (or inaccessible to) the PCS (102), the IOS (106), and other computing systems (not shown) forming a local area network (LAN) and/or wide area network (WAN), such as the Internet. By limitedly connected, the IRS (120) may block incoming connections from these aforementioned components, as well as block outgoing connections to these aforementioned components (with the exception of the issuance of get requests (described below)), thereby minimizing, if not eliminating, the exposure of the data stored within the IRS (120) to cyber attacks or threats and/or other anomalous or malicious cyber activity.

In one embodiment of the invention, the IRS (120) may include a replicated data retriever (122). The replicated data retriever (122) may be a communication interface for enabling the retrieval of replicated data instances and associated replicated data metadata, either in their entirety or through one or more replicated data fragments (described above), from the IOS (106). Further, the replicated data retriever (122) may be implemented using hardware, software, firmware, or any combination thereof. Examples of the replicated data transmitter (104) include, but are not limited to, a network interface controller/device, a network socket, one or more computer ports, etc.

In one embodiment of the invention, the replicated data retriever (122) may include functionality to: (i) establish/initiate a connection with the IOS (106); (ii) generate a get request (e.g., a HTTPS GET request) including an object ID; (ii) transmit the get request to the IOS (106); (iii) receive, in return from the IOS (106), one or more get responses, wherein each get response includes at least a portion or subset of an object (112A-112N) associated with the object ID, wherein the object (112A-112N) contains a replicated data instance (i.e., the replicated data), a replicated data ID associated with the replicated data instance, and replicated data metadata describing the replicated data instance (originating from the PCS (102)); and (iv) store the replicated data instance, replicated data ID, and replicated data metadata in the persistent storage (124) residing on the IRS (120). In one embodiment of the invention, the replicated data retriever (122) may include further functionality to, prior to storage, validate at least the replicated data instance to reveal any corruption therein. Validation of the replicated data instance may entail, for example, scanning the replicated data instance using one or more misuse detection algorithms. Misuse detection may refer to the subjection of the replicated data instance to algorithms that search for digital signatures associated with known cyber attacks, threats, or other malicious activities.

In one embodiment of the invention, the IRS (120) may include persistent or non-volatile storage (124). The persistent storage (124) may be implemented using, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), any other memory defined as a non-volatile Storage Class Memory (SCM), or any combination thereof. In one embodiment of the invention, the persistent storage (124) may incorporate data retention locking technology. Data retention locking may refer to the secure retaining of data so that data integrity is maintained. More specifically, data retention locking ensures that any data that is locked cannot be overwritten, modified, and/or deleted under any circumstances until a specified period of time (or a retention period) expires. The retention period may be specified by administrators of the PCS (102) and/or the IRS (120).

While FIG. 1 shows a configuration of components, other system configurations may be used without departing from the scope of the invention. For example, in one embodiment of the invention, the system (100) may further include a client computing system (not shown) that may be operatively connected to the IRS (120). The client computing system may be any computing system (see e.g., FIG. 5) programmed to interface with at least the IRS (120), and may be operated by a PCS (102) administrator. In such an embodiment, the client computing system may include functionality to: (i) generate and submit restore requests to the IRS (120), wherein a restore request may include the replicated data ID associated with a replicated data instance stored in the IRS (120); and (ii) receive restore responses, from the IRS (120), including the replicated data instance and associated replicated data metadata identified by the replicated data ID. In one embodiment of the invention, the client computing system may communicate with the IRS (120) for data restoring purposes after a failover event has occurred on the PCS (102). Examples of a client computing system may include, but are not limited to, a desktop computer, a laptop computer, a server, a mainframe computer, a datacenter terminal, etc. Moreover, in such an embodiment, the restoring of any replicated data from the IRS (120) may entail changes to the IRS (120) environment and/or IRS (120) administrator intervention. This may be the case because, as discussed above, the nature of the IRS (120) is to remain mostly disconnected (or limitedly connected) from other components of the system (100), which is guaranteed through the blocking of all incoming connections to the IRS (120) and all outgoing connections from the IRS (120) (with the exception of the exchange of information initiated by the transmission of get requests (e.g., HTTPS GET requests)). Therefore, in order to enable replicated data retrieval, changes to the IRS (120) must be implemented, which may include, for example, the unblocking of one or more incoming and/or outgoing connections associated with data protocols other than HTTPS.

Figure 2:
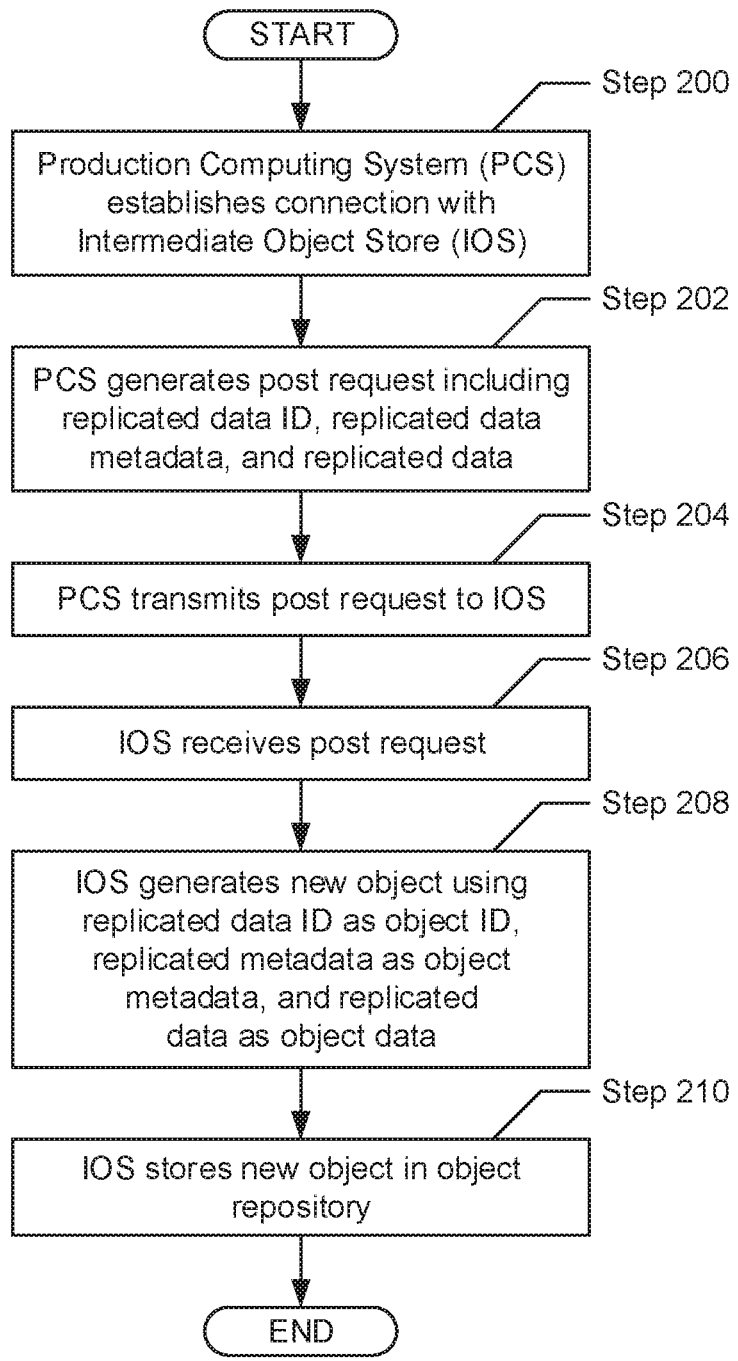
FIG. 2 shows a flowchart describing a method for storing an object in accordance with one or more embodiments of the invention.

FIG. 2 shows a flowchart describing a method for storing an object in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 2 may be performed in parallel with any other steps shown in FIG. 3 without departing from the scope of the invention.

Turning to FIG. 2, in Step 200, the PCS establishes a connection with the IOS. Specifically, in one embodiment of the invention, the replicated data transmitter of the PCS may initiate an Internet-based connection to the API of the IOS. In Step 202, after establishing a connection with the IOS, the PCS generates one or more post requests (e.g., one or more HTTPS POST requests). In one embodiment of the invention, each post request may include at least a portion or subset (i.e., a replicated data fragment) of a replicated data instance (i.e., replicated data), a replicated data ID uniquely identifying the replicated data, and/or replicated data metadata describing the replicated data. The replicated data instance, replicated data metadata, and replicated data ID may be copies of an original data instance, original data metadata, and original data ID, respectively, representative of information generated and/or otherwise utilized by one or more processes executing on the PCS.

In Step 204, the PCS transmits the one or more post requests (generated in Step 202) to the IOS by way of the connection established in Step 200. In Step 206, the IOS receives the set of one or more post requests from the PCS. While or after receiving the set of post requests, in Step 208, the IOS generates a new object using the contents of the set of post requests and, in Step 210, stores the new object in the object repository residing on the IOS. That is, in one embodiment of the invention, the IOS may process a received first post request to create a new object. The new object may store the replicated data ID, the replicated data metadata, and at least a fragment of the replicated data instance (if not the replicated data instance in its entirety) received in the first post request as an object ID, object metadata, and at least a portion of the object data (if not the object data in its entirety), respectively. Further, in one embodiment of the invention, as subsequent post requests, of the set of post requests, if any, are received, the IOS may process each subsequent post request to at least concatenate or append the replicated data instance fragment in the subsequent post request to the object data pertaining to the object. In another embodiment of the invention, the IOS may concatenate each of the replicated data instance fragments into a complete replicated data instance prior to instantiating and storing the object. In one embodiment of the invention, after processing all post requests of the set of post requests, the IOS may append a complete object tag (e.g., a bit, a flag, etc.) to the object metadata. The complete object tag may indicate that the object data stored in the object is complete (i.e., the replicated data instance in its entirety has been received and is stored therein).

Figure 3:
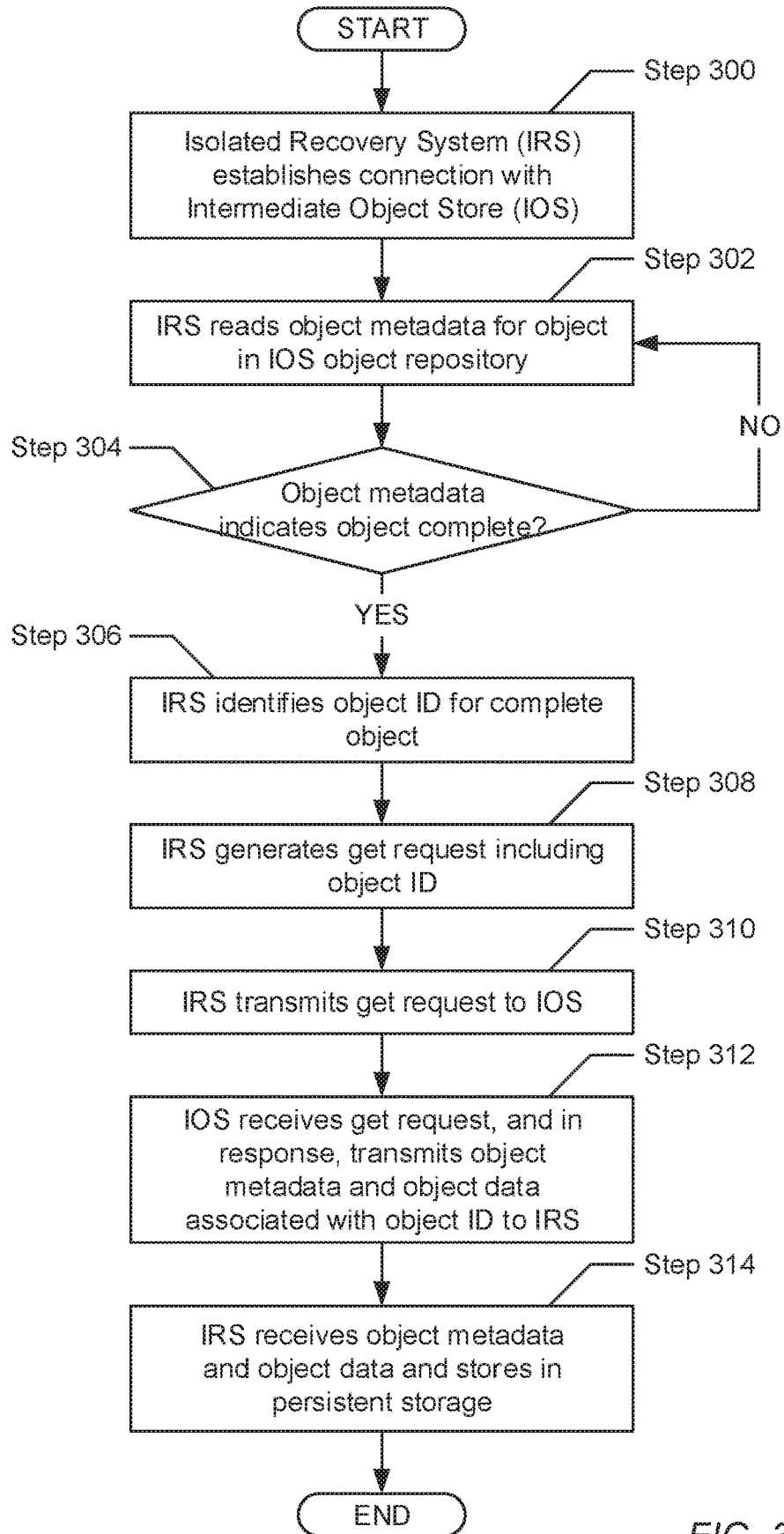
FIG. 3 shows a flowchart describing a method for retrieving an object in accordance with one or more embodiments of the invention.

FIG. 3 shows a flowchart describing a method for retrieving an object in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 3 may be performed in parallel with any other steps shown in FIG. 2 without departing from the scope of the invention.

Turning to FIG. 3, in Step 300, the IRS establishes a connection with the IOS. Specifically, in one embodiment of the invention, the replicated data retriever of the IRS may initiate an Internet-based connection to the API of the IOS. In Step 302, after establishing the connection with the IOS, the IRS accesses the object repository residing on the IOS. More specifically, in one embodiment of the invention, the IRS may select and thereafter, scan or read, the object metadata in an object to detect the presence of a complete object tag (described above). In detecting a complete object tag, the IRS may identify which objects, if any, are ready for retrieval.

In Step 304, a determination is made as to whether object metadata for an object includes a complete object tag. If it is determined that a complete object tag is present, indicating that the object is complete and ready for retrieval, the process proceeds to Step 306. On the other hand, if it is alternatively determined that a complete object tag is absent, indicating that the object is incomplete and not ready for retrieval, the process proceeds back to Step 302, wherein another object in the object repository may be scanned.

In Step 306, after determining (in Step 304) that the object metadata for an object includes a complete object tag, the IRS identifies or obtains the object ID associated with the (complete) object. In one embodiment of the invention, the IRS may also identify the storage space size associated with content within the object, which may also be read from the object metadata. Following the identification of the storage space size, the IRS may subsequently allocate storage space in the persistent storage residing thereon in preparation for storing (i.e., writing) the object contents therein. In Step 308, the IRS proceeds to generate a get request (e.g., a HTTPS GET request), which includes the object ID. In Step 310, after generating the get request, the IRS transmits the get request to the IOS.

In Step 312, upon receiving the get request from the IRS, the IOS identifies the object in the object repository associated with the object ID included in the get request. Afterwards, in one embodiment of the invention, the IOS may retrieve the object and extract at least the replicated data metadata and replicated data instance stored as the object metadata and object data of the object. The IOS may then generate a get response including at least the replicated data metadata and replicated data instance, and transmit the get response to the IRS. In Step 314, upon receiving the get response from the IOS, the IRS stores the contents of the get response (i.e., the replicated data metadata and the replicated data instance), along with the object ID (i.e., the replicated data ID) in persistent storage residing on the IRS. In one embodiment of the invention, however, prior to storing the contents of the get response, the IRS may validate at least the replicated data instance to identify whether the replicated data instance is clean (i.e., uncontaminated by malicious activity). The validation process may entail scanning the replicated data instance using misuse detection algorithms, which looks for digital signatures embedded in the replicated data instance that may be associated with known cyber threats and/or attacks. In this embodiment, if the validation process yields that malicious activity is present, the IRS may alternatively delete the contents of the get response rather than store the contents in the persistent storage.

Figure 4:
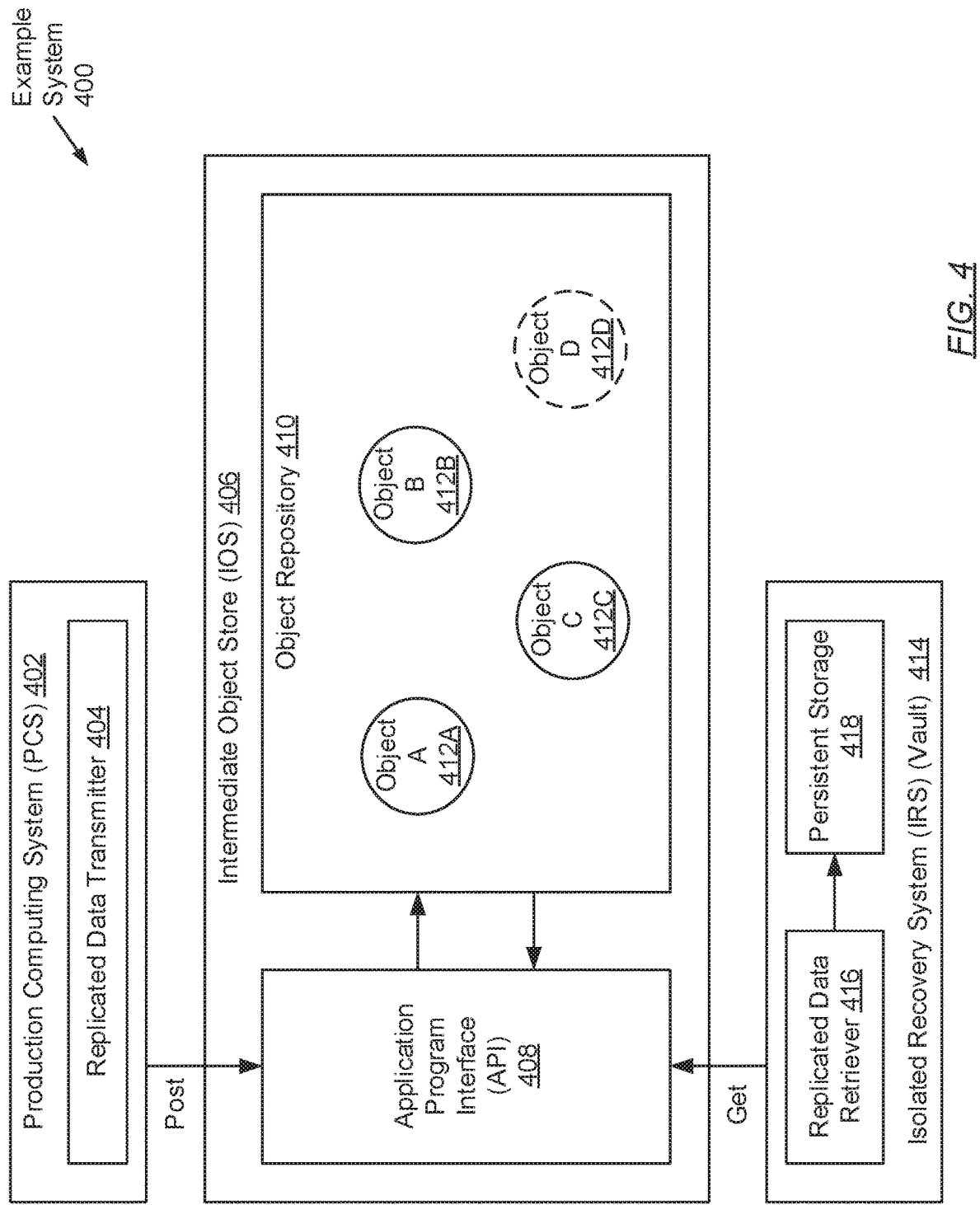
FIG. 4 shows an example system in accordance with one or more embodiments of the invention.

FIG. 4 shows an example system in accordance with one or more embodiments of the invention. The following example, presented in conjunction with components shown in FIG. 4, is for explanatory purposes only and not intended to limit the scope of the invention.

Turning to FIG. 4, the example system (400) includes a PCS (402), an IOS (406), and an IRS (414). The PCS (402) includes a replicated data transmitter (404), which may initiate connections that operatively connect the PCS (402) to the IOS (406). Further, the IOS (406) includes an API (408) and an object repository (410), wherein the object repository (410) contains three complete objects (412A-412C). Meanwhile, the IRS (414) includes a replicated data retriever (416), which may initiate connections that operatively connect the IRS (414) to the IOS (406), and persistent storage (418).

Turning to the example, consider a scenario whereby the PCS (402) has selected an original data instance, generated by a process executing thereon, to archive. The replicated data transmitter (404) may subsequently produce a copy of the selected original data instance. Specifically, the replicated data transmitter (404) generates a replicated data instance based on the original data instance, replicated data metadata based on original data metadata describing the original data instance, and a replicated data ID. Thereafter, the replicated data transmitter (404) initiates a connection to the IOS (406), or more specifically, to the API (408) of the IOS (406). After establishing the connection, the replicated data transmitter (404) generates two HTTPS POST requests. Each of the two HTTPS POST requests includes the replicated data ID, a portion of the replicated data metadata, and a fragment or subset of the replicated data instance. Following the creation of the HTTPS POST requests, the replicated data transmitter (404) transmits the HTTPS POST requests towards the IOS (406).

Upon arriving at the API (408) of the IOS (406), a first of the pair of HTTPS POST requests is processed by the API (408). Processing entails the creation of a fourth object (412D) in the object repository (410). Further, in processing the first HTTPS POST request, the replicated data ID included therein is stored as the object ID for the new object (412D), a first portion of the replicated data metadata included therein is stored as initialized object metadata, and a first fragment of the replicated data instance is stored as initialized object data. Further, in receiving the second of the pair of HTTPS POST requests, the API (408), similarly, processes the second HTTPS POST request to append the second portion of the replicated data metadata included therein to the initialized object metadata and a second fragment of the replicated data instance included therein to the initialized object data. After storing the contents of the second HTTPS POST request, the API (408) appends a complete object tag, an indication of a complete object, to the object metadata.

At a time unbeknownst to the IOS (406), the IRS (414), or more specifically, the replicated data retriever (416) of the IRS (414) initiates a connection to the API (408) of the IOS (406). Thereafter, the replicated data retriever (416) accesses the object repository (406), via the established connection, to identify which objects (412A-412D) are complete and ready for retrieval. Based on the accessing, the replicated data retriever (416) may identify that the latest object (412D) includes a complete object tag, thereby indicating that the object (412D) is complete and ready for retrieval. The replicated data retriever (416) may subsequently obtain the object ID associated with (and stored within) the object (412D), and generate a HTTPS GET request including the object ID. Following the generation of the HTTPS GET request, the replicated data retriever (416) transmits the HTTPS GET request towards the IOS (406).

Upon receiving the HTTPS GET request, the API (408) of the IOS (406) uses the object ID included therein to identify the appropriate object (412D) in the object repository (410). After identifying the object (412D), the API (408) reverts the object metadata into replicated data metadata, and reverts the object data into a replicated data instance. Subsequently, the API (408) generates two HTTPS GET responses. Each HTTPS GET response includes a portion of the replicated data metadata and a fragment of the replicated data instance. Following the generation of the HTTPS GET responses, the API (408) transmits the HTTPS GET responses towards the replicated data retriever (416) of the IRS (414).

In obtaining each HTTPS GET response from the IOS (406), the replicated data retriever (416) of the IRS (414) extracts the portion of the replicated data metadata and the fragment of the replicated data instance enclosed therein. The extracted portions of the replicated data metadata are then concatenated to form the replicated data metadata in its entirety, and similarly, the fragments of the replicated data instance are concatenated to form the replicated data instance in its entirety. After their reconstruction, the replicated data retriever (416) proceeds to validate at least the replicated data instance. As discussed above, the validation process may entail subjecting the replicated data instance to one or more misuse detection algorithms. Misuse detection refers to the scanning of the replicated data instance for digital signatures associated with known cyber threats, attacks, and/or other malicious activities. Based on this validation process, the replicated data retriever (416) identifies the absence of any digital signatures associated with known attacks, threats, and/or other malicious activities in the newly received and reconstructed replicated data instance. In response to this, the replicated data retriever (416), finally, stores the object ID (i.e., the replicated data ID), the replicated data metadata, and the replicated data instance at a memory location in the persistent storage (418) on the IRS (414).

Figure 5:
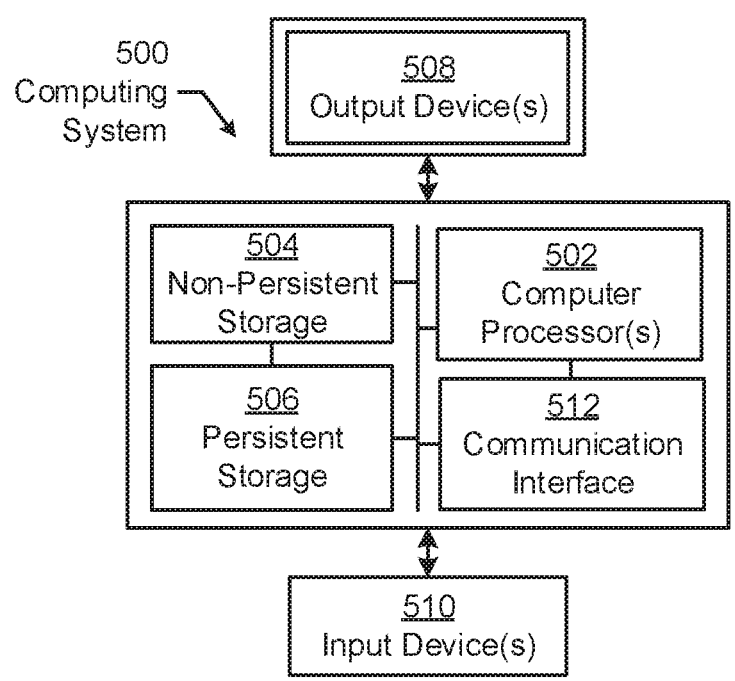
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a cloud-based dead drop for isolated recovery systems. The introduction of a dead-drop (i.e., the IOS disclosed herein) prevents direct contact or communications between the PCS and the IRS. In severing their direct contact, the presence of the IOS minimizes, if not eliminates, the vulnerability and exposure of the IRS to outside cyber threats and attacks. To increase the effectiveness of an isolated data storage environment, embodiments of the invention also restrict the initiation of any connections linking the IOS and the IRS to solely the IRS. Hence, incoming connections initiated by the IOS or PCS (e.g., potentially initiated by a cyber threat or attack) to the IRS are subsequently denied, if not impossible. Furthermore, introduction of the IOS, in accordance with embodiments of the invention, also severs a previously inherent dependence of the IRS on the PCS. Specifically, prior to the invention disclosed herein, and due at least in part to the previously necessary direct communications between the IRS and the PCS, the configuration (e.g., hardware, software, and/or firmware versions, etc.) of the IRS had to be compatible with the configuration of components representative and/or executing on the PCS. However, due to the interjection of the IOS per embodiments of the invention, this aforementioned compatibility dependence across the PCS and IRS is no longer a concern, resulting in the feasibility of implementing different hardware, software, and/or firmware components and versions at the PCS versus the IRS. The implementation of different configurations on the PCS versus the IRS thus permits the IRS to be deployed as a service. Moreover, in deploying as a service, the IRS may be implemented as a secure data backup and archiving solution to any existing PCSs easily and inexpensively.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data, comprising:
   allocating, by an isolated recovery system (IRS), storage space in the IRS, wherein the IRS comprises a replicated data retriever operatively connected to an object repository of an intermediate object store (IOS);
   reading an object from the object repository of the IOS for a production computing system (PCS) operatively connected to the IOS; and
   writing object contents extracted from the object in the storage space,
   wherein the IRS restricts the initiation of incoming connections from the IOS and the PCS to minimize exposure to cyber threats.

2. The method of claim 1, further comprising:
   prior to reading the object from the IOS:
      generating a hyper text transfer protocol secure (HTTPS) GET request comprising an object ID associated with the object; and
      transmitting the HTTPS GET request to the IOS.

3. The method of claim 1, wherein the IRS and the PCS are co-located in a data center.

4. The method of claim 1, wherein the IRS is located in a public cloud computing environment.

5. The method of claim 1, wherein the object contents comprises a replicated data instance and replicated metadata describing the replicated data instance.

6. The method of claim 1, wherein the IRS is deployed as a service.

7. A system, comprising:
   a production computing system (PCS);
   an intermediate object store (IOS) comprising an object repository operatively connected to the PCS; and
   an isolated recovery system (IRS) comprising a replicated data retriever operatively connected to the object repository, and programmed to:
      allocate storage space in a persistent storage of the IRS;
      read an object from the object repository; and
      write object contents extracted from the object in the persistent storage,
   wherein the IRS restricts the initiation of incoming connections from the IOS and the PCS to minimize exposure to cyber threats.

8. The system of claim 7,
   wherein the IOS is programmed to:
      receive a hyper text transfer protocol secure (HTTPS) GET request from the replicated data retriever;
      identify the object of a plurality of objects stored in the object repository using the object ID;
      extract the object contents from within the object; and
      transmit the object contents to the replicated data retriever.

9. A non-transitory computer readable medium (CRM) comprising computer readable program code, which when executed by a computer processor, enables the computer processor to:
- allocate, by an isolated recovery system (IRS), storage space in the IRS, wherein the IRS comprises a replicated data retriever operatively connected to an object repository of an intermediate object store (IOS);
- read an object from the object repository of the IOS for a production computing system (PCS) operatively connected to the IOS; and
- write object contents extracted from the object in the storage space,
- wherein the IRS restricts the initiation of incoming connections from the IOS and the PCS to minimize exposure to cyber threats.

10. The non-transitory CRM of claim 9, further comprising additional computer readable program code, which when executed by the computer processor, enables the computer processor to:
- prior to reading the object from the IOS:
  - generate a hyper text transfer protocol secure (HTTPS) GET request comprising an object ID associated with the object; and
  - transmit the HTTPS GET request to the IOS.

11. The non-transitory CRM of claim 9, wherein the IRS and the PCS are co-located in a data center.

12. The non-transitory CRM of claim 9, wherein the IRS is located in a public cloud computing environment.

13. The non-transitory CRM of claim 9, wherein the object contents comprises a replicated data instance and replicated metadata describing the replicated data instance.

14. The non-transitory CRM of claim 9, wherein the IRS is deployed as a service.

* * * * *